US012260781B2

(12) United States Patent
Carmichael et al.

(10) Patent No.: US 12,260,781 B2
(45) Date of Patent: Mar. 25, 2025

(54) INTERACTIVE AVATAR TRAINING SYSTEM

(71) Applicant: Interactive Video Images, Inc., New York, NY (US)

(72) Inventors: David Patrick Carmichael, Plano, TX (US); Roger Nelson, Emeryville, CA (US); John J. Maley, Lambertville, NJ (US); Jeffrey Shapiro, New York, NY (US)

(73) Assignee: Interactive Video Images, Inc., New York, NY (US)

( * ) Notice: Subject to any disclaimer, the term of this patent is extended or adjusted under 35 U.S.C. 154(b) by 908 days.

(21) Appl. No.: 17/183,797

(22) Filed: Feb. 24, 2021

(65) Prior Publication Data
US 2022/0270505 A1  Aug. 25, 2022

(51) Int. Cl.
  *G09B 7/02* (2006.01)
  *G06F 40/279* (2020.01)
  *G06Q 50/20* (2012.01)

(52) U.S. Cl.
  CPC ............ *G09B 7/02* (2013.01); *G06F 40/279* (2020.01); *G06Q 50/2057* (2013.01)

(58) Field of Classification Search
  None
  See application file for complete search history.

(56) References Cited

U.S. PATENT DOCUMENTS

| | | | |
|---|---|---|---|
| 6,409,599 B1 | 6/2002 | Sprout et al. | |
| 7,048,544 B2 | 5/2006 | Olsen | |
| 9,386,268 B2 * | 7/2016 | Tong | G06V 40/168 |
| 9,495,882 B2 | 11/2016 | Cohen et al. | |
| 9,569,876 B2 * | 2/2017 | Shuster | A63F 13/57 |
| 9,679,495 B2 | 6/2017 | Cohen | |
| 9,740,987 B2 | 8/2017 | Dolan | |
| 10,127,831 B2 | 11/2018 | Cohen et al. | |
| 10,446,055 B2 | 10/2019 | Gupta et al. | |
| 10,672,288 B2 | 6/2020 | Ribeira et al. | |
| 11,474,596 B1 * | 10/2022 | Aloisio | G06F 11/3093 |
| 2004/0078204 A1 | 4/2004 | Segond et al. | |
| 2004/0230410 A1 | 11/2004 | Harless et al. | |
| 2009/0199095 A1 | 8/2009 | Nicol, II et al. | |

(Continued)

FOREIGN PATENT DOCUMENTS

WO   WO-2020002214 A1 *  1/2020  .......... G09B 19/003

OTHER PUBLICATIONS

International Search Report and Written Opinion issued in Appln. No. PCT/US2022/017677 mailed Jun. 2, 2022 (13 pages).

(Continued)

*Primary Examiner* — Eugene L Kim
*Assistant Examiner* — Alyssa M Hylinski
(74) *Attorney, Agent, or Firm* — Lerner David LLP (57) ABSTRACT

The technology relates generally to an interactive avatar training system. The interactive avatar training system utilizes an interactive platform that allows at least two users, such as a trainer and a trainee, to be in interactive communication in a training program. The interactive avatar training system may assist generating a processed answer or response from the trainer to the trainee so that the answer presented to the trainee has high level of accuracy. Thus, the training efficiency and accuracy may be enhanced and improved.

18 Claims, 7 Drawing Sheets

(56) References Cited

U.S. PATENT DOCUMENTS

| | | | |
|---|---|---|---|
| 2010/0023879 A1 | 1/2010 | Finn et al. | |
| 2013/0051547 A1* | 2/2013 | Chavez | G06Q 10/103 |
| | | | 379/265.09 |
| 2013/0257877 A1 | 10/2013 | Davis | |
| 2015/0072321 A1 | 3/2015 | Cohen | |
| 2015/0364049 A1* | 12/2015 | Smith | G09B 5/12 |
| | | | 434/335 |
| 2016/0098936 A1* | 4/2016 | Solomon | G09B 19/0046 |
| | | | 434/276 |
| 2017/0018200 A1* | 1/2017 | Nemire | G09B 5/065 |
| 2017/0206797 A1* | 7/2017 | Solomon | G06N 3/006 |
| 2018/0301050 A1* | 10/2018 | Afzal | G09B 7/02 |
| 2019/0130788 A1* | 5/2019 | Seaton | G06F 3/0346 |
| 2019/0197756 A1 | 6/2019 | Shuster | |
| 2019/0304188 A1* | 10/2019 | Bridgeman | G09B 5/14 |
| 2019/0392728 A1* | 12/2019 | Pike | G09B 19/003 |
| 2020/0380030 A1* | 12/2020 | Colas | G06F 16/73 |
| 2021/0064646 A1* | 3/2021 | Nguyen | G06F 16/48 |

OTHER PUBLICATIONS

Yu et al. "A Dynamic Time Warping Based Algorithm to Evaluate Kinect-Enabled Home-Based Physical Rehabilitation Exercises for Older People," Sensors, Jun. 28, 2019. Retrieved on May 8, 2022. Retrieved from <URL:https://www.mdpi.com/1424-8220/19/13/2882/htm> entire document.

\* cited by examiner

INTERACTIVE AVATAR TRAINING SYSTEM

BACKGROUND

Many companies provide professional training programs to their employees. For example, training programs are provided to maintain and improve professional competence, promote career progression, improve the overall workplace environment, and comply with professional regulations and compliance. Such training programs often provide the employees a significant amount of information, such as a variety of policies, rules, or procedures, so that the employees can learn and competently perform tasks to the employer's standards and expectations.

Conventionally, training programs have been performed live or through conference calls between trainers and employees. However, such conventional programs have encountered problems with effectiveness due to inconsistencies in their delivery and content. In addition to these problems, conventional training programs are typically labor intensive and therefore, costly.

SUMMARY

The present disclosure provides an interactive avatar training system. The interactive avatar training system provides an interactive virtual platform that enables at least two users, such as a trainer and a trainee, to interactively communicate in a training program to promote training efficiency and accuracy during training. In one example, an interactive avatar training system includes a server computing device. The server computing device includes one or more memories. The one or more memories may include a database that may store key words and/or questions that may facilitate operation of the interactive avatar training system. One or more processors are in communication with the one or more memories. The one or more processors is configured to receive a first input to create a first avatar associated with a first user of a first computing device, receive a second input to create a second avatar associated with a second user of a second computing device, present the first and the second avatars in a virtual employee training environment, receive a question from the first computing device in the virtual employee training environment, and output an answer in response to the question in the virtual employee training environment.

In one example, prior to outputting the answer, the one or more processors are further configured to receive the answer from the second computing device. The one or more processors are further configured to process the received answer to generate a processed answer, wherein the processed answer is the output answer. In one example, the one or more processors are further configured identify a key word from the answer from the second computing device, and generate the processed answer based on the identified key word.

In one example, prior to outputting the answer, the one or more processors are further configured to access a pre-stored database of answers from the one or more memories, and select an answer from the pre-stored database, wherein the selected answer is the output answer. The one or more processors are further configured to identify a key word from the question. The answer is generated by a machine learning algorithm.

In one example, the one or more processors are further configured to generate a recommendation score with the answer. The one or more processors are further configured to output one or more answers in the virtual employee training environment and generate a recommendation score to each of the answers. The one or more processors are further configured to record the question and the answer generated in the virtual employee training environment. The one or more processors are further configured to replay the question and the answer in the virtual employee training environment. The first and the second computing device are in communication with the server computing device via network. The answer is generated in real time or is selected from predetermined answers in the virtual employee training environment.

In one example, the first avatar represents a trainee and the second avatar represents a trainer. The one or more processors are further configured to display a training content to the first avatar in the virtual employee training environment. The one or more processors are further configured to generate a plurality of tests to the first avatar in the virtual employee training environment.

The present disclosure further provides an interactive avatar training system comprising a server computing device, a first computing device in communication with the server computing device, a second computing device in communication with the server computing device, wherein the server computing device is configured to receive a first profile input for creating a first avatar from the first computing device, receive a second profile input for creating a second avatar from the second computing device, generate a simulated learning environment comprising the first avatar and the second avatar that allows interaction between the first and the second avatars, receive a question from the first avatar during the interaction, generate an answer in response to the question using a machine learning algorithm, and output the answer in the simulated learning environment.

In one example, the one or more processors are configured to identify a key word from the question to refine a scope of the answer. The one or more processors are configured to generate a recommendation score with the answer.

The present disclosure further provides an interactive avatar training system comprises a server computing device includes one or more memories, one or more processors in communication with the one or more memories, the one or more processors configured to receive a first profile input for creating a first avatar, present a first image of the first avatar in a simulated environment, receive a second profile input for creating a second avatar, present a second image of the second avatar in the simulated environment, receive an inquiring input from the first avatar, transmit the inquiring input to the second avatar in the simulated environment, generate an initial responding input from the second avatar, process the initial responding input in the simulated environment, generate a processed response based on the initial responding input, and output the processed response to the first avatar the simulated environment.

DETAILED DESCRIPTION

The technology relates generally to an interactive avatar training system. The interactive avatar training system utilizes an interactive virtual platform that allows at least two users, such as a trainer and a trainee, to be in interactive communication in a training program. In one example, a first user, such as a trainer, may create a first avatar to represent himself/herself in a virtual environment defined in the interactive avatar training system for a training program. A second user, such as a trainee, may create a second avatar to represent himself/herself in the virtual environment in the interactive avatar training system. The first and second users may communicate through their respective avatars in an environmental simulation in the virtual environment. In this regard, the first and the second users may be located remotely from each other but may utilize the virtual environment to communicate with each other in real-time.

A key term identifying engine is utilized to analyze the query and/or response from the first and the second users. For example, the input and/or query from the users may be analyzed to identify the parameters, identifiers, or key terminologies so that proper feedback, answers or responses may be generated based on the identifiers identified from the input and/or query. In some examples, based on the parameters, identifiers, or key terminologies identified from the query, an answer engine implemented in the interactive avatar training system may assist providing an updated, modified, processed, and/or perfected answer in response to the query. The answer provided by the trainer to the trainee may be created in real time or retrieved from pre-recorded answers stored in the interactive avatar training system.

Figure 1:
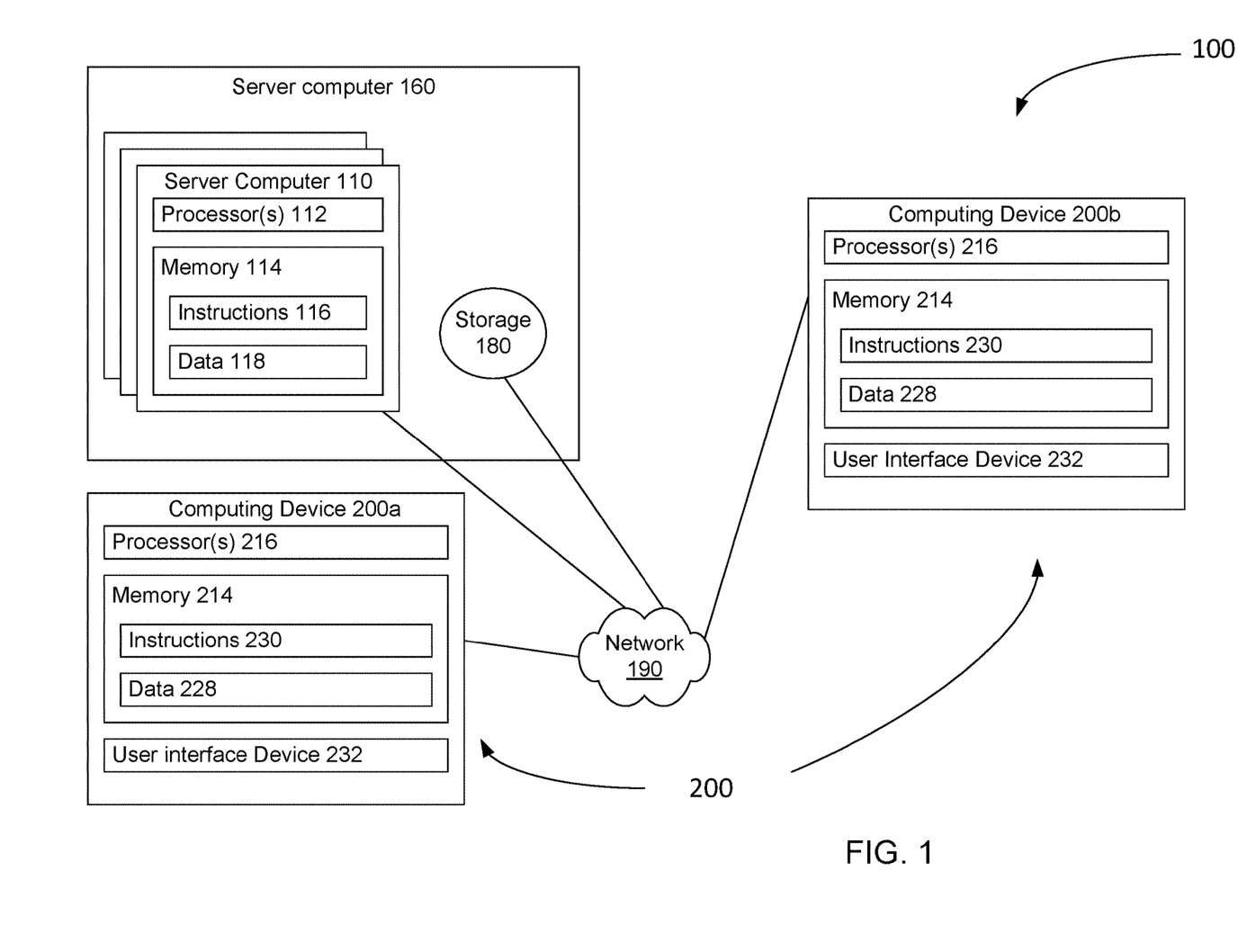
FIG. 1 is a functional diagram of an interactive avatar training system in accordance with aspects of the disclosure.

FIGS. 1-5 illustrate example interactive avatar training systems. As shown in FIG. 1, the interactive avatar training system 100 may include a server computer 160 and computing devices 200a, 200b, collectively referred to herein as computing devices 200, and storage device 180. The computing devices 200 and the server computer 160 are communicatively coupled via network 190, such that the computing devices 200 may communicate with the server computer 160 and/or other computing devices over the network 190. Similarly, the server computer 160 may communicate with computing devices 200, other computing devices, or other server computers 160 via the network 190.

The server computer 160 may contain one or more processors 112, memory 114, and other components typically present in general purpose computers. The memory 114 can store information accessible by the processor 112, including instructions 116 that can be executed by the processor 112. The memory 114 can also include data 118 that can be retrieved, manipulated, or stored by the processor 112. In one example, the data 118 in the memory 114 may include key words and/or questions that may be utilized when operating the interactive avatar training system. The memory 114 may be a type of non-transitory computer readable medium capable of storing information accessible by the processor 112, such as a hard-drive, solid state drive, tape drive, optical storage, memory card, ROM, RAM, DVD, CD-ROM, write-capable, and read-only memories. Processor 112 can be any conventional and/or commercially available processor. Alternatively, or additionally, the processor 112 can be a dedicated controller configured to perform specific functions, such as a GPU or an ASIC.

The instructions 116 can be a set of instructions executed by the processor 112. The instructions 116 can be stored in any format for processing by the processor 112, such as object code, or other computer code in any computer language, such as Java, Python, Ruby, etc. Instructions are explained in more detail in the foregoing examples and the example methods below. The instructions 116 may include any of the example features described herein.

The data 118 can be created, retrieved, stored, or otherwise modified by the processor 112 in accordance with the instructions 116. For example, although the subject matter described herein is not limited to use of a particular data structure, the data 118 can be stored in computer registers, in a relational or non-relational database as a table having a plurality of different fields and records, or as JSON, YAML, proto, or XML documents. The data 118 can also be formatted in a computer-readable format such as, but not limited to, binary values, ASCII or Unicode. Moreover, the data 118 can include information sufficient to identify relevant information, such as numbers, descriptive text, proprietary codes, pointers, references to data stored in other memories, including other network locations, or information that is used by a function to calculate relevant data. Details about the instructions 116, data 118, and other applications in the server computer 110 will be described in greater detail below.

Although FIG. 1 illustrates processor 112 and memory 114 as being co-located within server computer 110, processor 112 and memory 114 may include multiple processors and memories that may or may not be stored within the same physical device.

Each of the computing devices 200 may be configured similarly to the server computer 110, with one or more processors, memory, and instructions. The computing devices 200 may contain processors 216, memories 214, instructions 230, and data 228 as described with regard to server computer 160. The computing devices 200 may have all of the components normally used in connection with a personal computing device such as a central processing unit (CPU), memory (e.g., RAM and internal hard drives) input and/or output devices, sensors, clocks, network interface controllers, etc.

Further as shown in FIG. 1, the computing devices 200 may include a user interface device 232 such as input and output components. For example, user interface device 232 may include one or more of a keyboard, mouse, mechanical actuators, soft actuators, touchscreens, microphones, sensors, user display, a touchscreen, one or more speakers, transducers or other audio outputs, a haptic interface or other tactile feedback that provides non-visual and non-audible information to the user, and/or other components, which will be further described herein.

The server computer 160 and the computing devices 200 can be capable of direct and indirect communication, such as over network 190. In this regard, network 190 provides connectivity between the computing devices 200 and/or between the server computer 160 and computing devices 200. The network 190 may utilize communication protocols and systems such as internet, Ethernet, WiFi, satellite communications, HTTP, and/or protocols that are proprietary to one or more companies, and various combinations of the foregoing. For example, the network 190 may be wired or wireless local area network (LAN), wide area network (WAN), intranet, cellular communication networks, internet, and/or any combination of protocols and systems. Communication over network 190 may be facilitated by devices capable of transmitting data to and from other computers, such as through network interface controllers connected or otherwise integrated into computing devices 200 and server 190.

Figure 2:
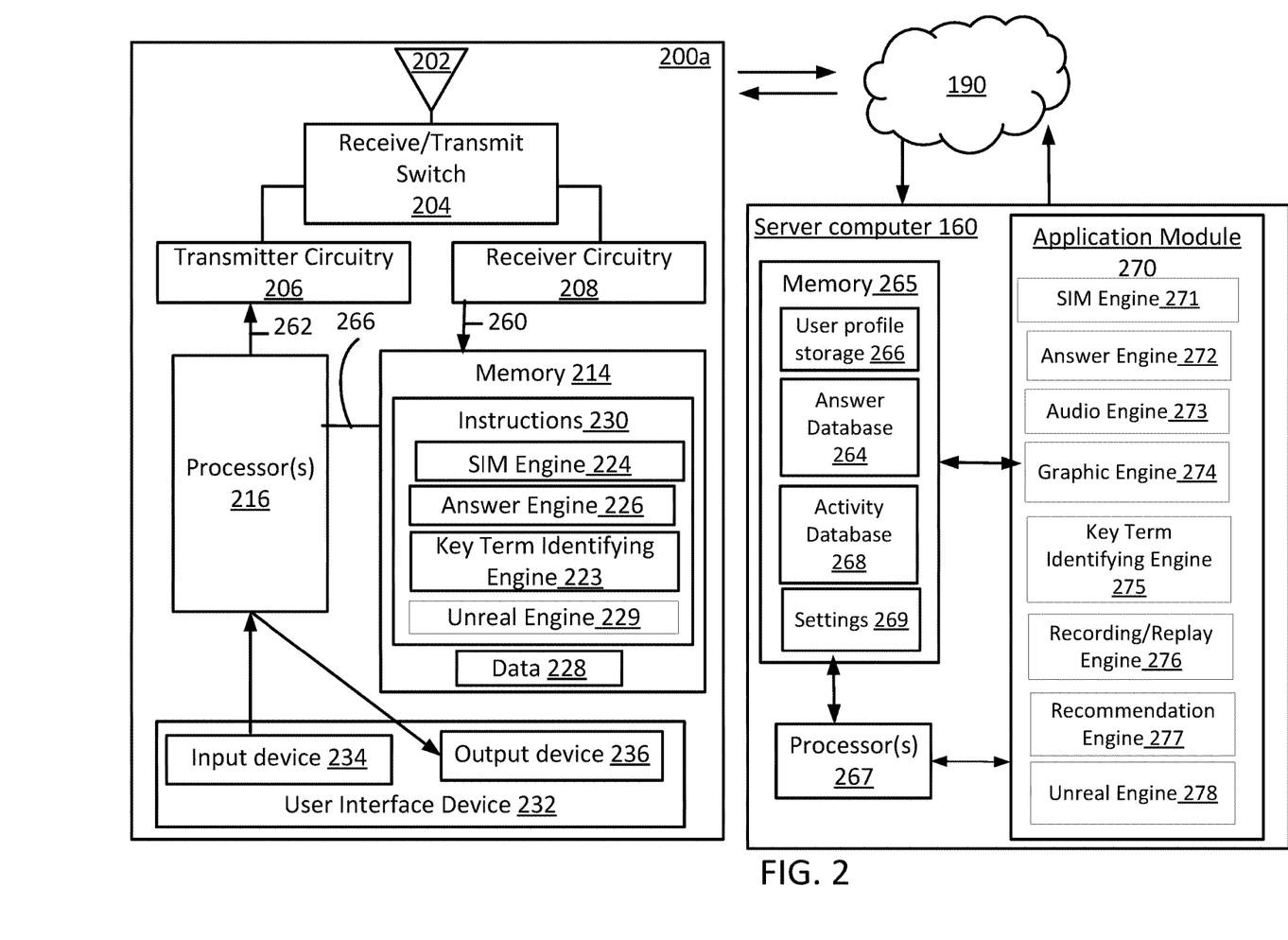
FIG. 2 is another functional diagram of the interactive avatar training system in accordance with aspects of the disclosure.

FIG. 2 depicts a detailed block diagram of an example computing device 200a. The computing device 200a may be any device that can perform a computational operation or computational analysis.

Computing device 200a has multiple components embedded therein. Each component may be in direct or indirect communication with each other. In the example depicted in FIG. 2, the computing device 200a includes one or more processors 216 configured to be in electrical communication with a user interface device 232, memory 214, a transmitter circuitry 206, and a receiver circuitry 208. As further shown in FIG. 2, memory 214 can also have stored therein software applications 227 for example, a virtual simulation application that may be utilized to execute a virtual training environment as described herein.

An antenna 202 may be disposed in, or otherwise connected to, computing device 200a. The antenna may be configured to receive and transmit Radio Frequency (RF) signals, WiFi signals, Bluetooth signals, or any suitable electrical signals. A receive/transmit (Rx/Tx) switch 204 may selectively couple the antenna 202 to the transmitter circuitry 206 and receiver circuitry 208. The receiver circuitry 208 demodulates and decodes the electrical signals received from the network 190 for processing by processor 216.

The user interface device 232 includes input devices 234, output devices 236 or other user interface components (not shown in FIG. 2) configured to allow a user to interact with and control the software applications 227 and the instructions 230 installed on the computing device 200a. The input devices 234 may include devices through which a user may provide data to computing device 200a, such as by way of non-limiting example a keypad, keyboard, mouse, controller, microphone, camera, touch screen, etc. The output devices 236 may include devices through which a user is provided data from the computing device 200a, such as by way of non-limiting example, a display screen, a speaker, a touch screen, a haptic output, a virtual reality headset, and so on. Certain devices, such as a touch screen, may operate as both input and output devices. For example, a touch screen may not only display content but also provides a touch-activated interface that allows the user to input commands and to actively interact therewith. Additional examples of input and output devices 234, 236 may include a directional pad, a directional knob, accelerator, a Push-To-Talk ("PTT") button, sensors, a camera, a Radio Frequency Identification ("RFID")/Near Field Communication ("NFC") reader, sound/audio recognition devices, motion detector, accelerometers, activity monitors, and the like. As further described herein, a user may directly provide information, input or a query by direct input to the user interface device 232 on the computing device 200a. Similarly, other methods of establishing the operations or configurations of the computing device 200a may be employed.

The applications 227 stored in the memory 214 may include, but are not limited to, software applications operative to perform the various methods, features, and functions described herein. Furthermore, the instructions 230 may include applications and other software programs that may be configured or stored in the memory 214 that allow the user to repetitively use these instructions 230 for a user customized preference when interacting with the virtual simulation application configured to execute the interactive avatar training system.

It is noted that the modules, engines, elements, etc. for establishing the avatars in the virtual environment for the interactive avatar training system may be configured in the server computer 160. In some instances the modules, engines, or elements, etc., may be configured locally in the computing device 200a.

In one example, the virtual simulation application may utilize a simulation (SIM) engine 224 saved in the memory 214 and executable by the processor 216. For example, a user may set his/her profile and save the input profile information in the memory 214 to customize settings in the simulation (SIM) engine 224. Accordingly, such information may be saved for repetitive uses when needed. It is noted that the instructions 230 in the memory 214 may be in communication with the simulation (SIM) engine 224 when executed by the processor 216 so as to enable the operation of the instructions 230 being performed in the simulation (SIM) engine 224, or other associated engines, by the processor 216. For example, the simulation (SIM) engine 224, the answer engine 226, and the key term identifying engine 223 that may include one or more corresponding key words, may be loaded and executed in processor 216. It is noted that other engines or modules may also be loaded and executed by processor 216.

The simulation (SIM) engine 224 may be executed both by the processor 216 from the computing device 200a or by the processor 267 from the server computer 160. It is noted that the simulation (SIM) engine 224 may be configured in the memory 214 from the computing device 200a or in the memory 265 and/or application module 270 in the server computer 160, or other suitable memory devices that may be in communications of the computing device 200a or server computer 160 that may enable the execution of the simulation (SIM) engine 224. In this regard, a user may access the SIM engine in server computer 160 via network 190. The simulation (SIM) engine 224 may generate avatars for users. In one example, each avatar created may be a representation of a user operating a computing device, such as computing device 200a. The appearance of an avatar may be a 3D model constructed based on an image and/or video feed of the user captured by an input device 234, such as a camera. For example, in response to a user input, the simulation (SIM) engine 224 may initiate the camera in the computing device 200a to capture video or images containing the face and/or body/clothing of the user. The simulation (SIM) engine 224 processes the image/video of the user The image/video is then mapped to capture the face and/or body/clothing of the user to create the corresponding avatar, such that the facial and/or body expressions of the user can be shown in real time in the virtual space as the facial and/or body expressions of the avatar.

The simulation (SIM) engine 224 may receive an input command to establish an avatar for display and presentation on the computing device 200a, or other remote devices or in a virtual space, etc. The input command from the user may be captured and detected by the user interface device 232 of the computing device 200a and processed by the simulation (SIM) engine 224. The input command from the user may include touch events captured by the touch screen from the input device 234. Gestures, voice, or other biometric characteristics may be captured by the camera to create the avatar with high similarity to the appearance and personal deportment of the user. For example, facial detection, head movement detection, facial/body expression detection, or other detections or captures may be performed to specify the look and feel of the avatar in a virtual space. Furthermore, animation commands, such as changing color or style of an outfit, may also be input by the user for establishing the avatar based on user's preference. The animation commands may be conducted by a tap, a pinch, a drag or other commands.

Furthermore, audio communication may also be captured. The simulation (SIM) engine 224 may initiate a microphone from the input device 234 to capture audio input (sound, voice), e.g., user speech, from the user and convert the captured sound into a corresponding audio signal. In one example, the audio signal may be transformed into an avatar speech signal that may then be transmitted and output for presentation. Received avatar speech signal may then be converted back to sound by an output device 236, such as a speaker. The received avatar speech signal may be further processed or analyzed by the answer engine 226, which will be described in detail below. The avatar speech may be based on the user speech. For example, transformations include, but are not limited to, pitch shifting, stretching and/or altering playback rate.

Thus, the simulation (SIM) engine 224 in the computing device 200a may create avatars based on the input by the user, or the signal information captured by the user interface device 232. Audio may be transformed, and video may be animated based on detected user inputs and identified animation commands to enhance user experience with the avatar communication.

An unreal engine 229 may be in communication with the simulation (SIM) engine 224 to populate and present the generated avatars in a virtual environment. The unreal engine 229 may be a virtual reality engine that communicates with the simulation (SIM) engine 224 to provide virtual environment data to the computing device 200a. The virtual environment may be accessed remotely and avatars within the virtual environment may communicate and otherwise interact within the virtual environment.

The answer engine 226 is configured to process the audio signals from the user. The answer engine 226 may convert the audio signals into textual data for analysis. Identifiers, key words, key terminologies (collectively referred as "identifiers" herein) from the textual data may be identified and analyzed by the key term identifying engine 223. The identifiers may be pre-stored, such as in data 228 of computing device 200a, or in the answer database 264 of the server computer 160.

The data 228 or answer database 264 may have a corresponding pre-stored response/answer linked in the answer engine 226. Thus, once the identifiers from the audio signals are identified, detected or recognized by the key term identifying engine 223, the detected identifiers may then be utilized to search the data 228 or the answer database 264 for an answer or response. Furthermore, the detected identifiers may assist with identifying suitable rules, principles, situations, events or activities that fit the input from the user so as to look for a proper answer or response from the database. The detected identifiers and the identified key words may also assist with refining a scope of the answer.

Once the answer and/or the response is mapped and selected, the answer engine 226 may further convert the answer and/or the response to a speech signal to output as an avatar speech signal through the simulation (SIM) engine 224. The answer engine 226 may assist lip synchronization tied to the avatar when outputting the avatar speech signal.

In one example, when a corresponding answer or response from the database is identified in the answer engine 226, the answer engine 226 may further optimize, process, and perfect the answer and/or the response prior to outputting the avatar speech signal. For example, an algorithm programed in the answer engine 226 may assist with providing a professional level answer or response, such as a well-explained, elite level answer or response. Thus, a professional level answer or response may be generated even though, in some situations, only few identifiers are identified by the key term identifying engine 223. The algorithm programed in the answer engine 226 may utilize a machine learning technique, an artificial intelligence system, a deep learning technique, or other similar techniques to assist with generating an answer or response based on the input from the avatar controlled by the user. Thus, in the example wherein the input from the user does not include sufficient details or explanation, such as a simple but not so clear answer, the algorithm programed in the answer engine 226 may assist filling in the gap of the missing information and generate an answer or response with sufficient details having the professional level information and knowledge. The algorithm programmed in the answer engine 226 may be trained by repetitive inputs from the avatars, or by other suitable big data analysis technique. In one example, the answer engine 226 may output the avatar speech signal in a natural language form.

As shown in FIG. 2, the server computing 160 may include at least one processor 267, similar to the processor 216 configured to execute instructions and settings 269 from the memory 265. A user may access and interact with the server computing 160 through one or more of the computing devices, such as computing device 200a. In one example, the memory 265 may include a user profile storage 266, an answer database 264, an activity database 268, settings 269, or other data stored in the memory 265 to facilitate operation of the interactive avatar training system in the server computer 160. When authorized by the user, the user profile storage 266 may store information specific to the user for creating the avatar, such as clothing preferences, voice tone selection, gesture, habits, or the like so as to provide customized information to the avatar set by the user. Any personally identifiable information is scrubbed or encrypted or otherwise protected to protect the user's identity and privacy when needed. Accessing the data associated with the user will also require authorization from the user.

The answer database 264 and the activity database 268 in the memory 265 may store information that facilitates operation of the interactive avatar training system. For example, and as discussed above, the answer database 264 and/or and the activity database 268 may store data including activities, responses or answers to various situations for the interactive avatar training system concerning a trainee. The data may also include information relating to areas of expertise of the corporate which are critical or regarded as important to the corporate. The data as stored may include text-based and/or graphic based information conveying the responses or answers to a topic, a situation, a series of real-life or fictitious examples to illustrate a topic as applied to a situation, an activity, an event, some simulation materials that provide interactive peer-to-peer or trainer-to-trainee practice sessions directed to a specified topic so that the user can assess his/her ability to solve a problem or handle a situation, and any other type of training situations desired by the corporate, and the like. The data stored in the answer database 264 and the activity database 268 may be generated by the corporate utilizing the interactive avatar training system or may be commercially available from other entities. Furthermore, the activity database 268 may also store information, such as training content, to help the trainee further define their behaviors, such as honesty, integrity, and candor, under certain situations. Furthermore, the activity database 268 may also store a list of test questions so that the trainer may utilize to access the competencies of the trainee after the training content is delivered to the trainee. The processor 267 may be utilized configured to execute command from the settings 269 to perform operations in the interactive avatar training system.

In one example, an application module 270 including several engines or modules may be included in the server computer 160. It is noted that the application module 270 may be programed or configured to be under settings 269, or other suitable databases in the memory 265. The engines 271, 272, 273, 274, 275, 276, 277, 278 configured in the application module 270 are executable components. In the example depicted in FIG. 2, the application module 270 includes a SIM engine 271, an answer engine 272, an audio engine, 273, a graphic engine 274, a key term identifying engine 275, a recording/replaying engine 276, a recommendation engine 277, and an unreal engine 278. In one example, one or more key term identifying engines 275 may each include one or more corresponding key words, such as key word one, key word two, key word three, and so on, to facilitate identification of key words from a query. It should be understood that these are merely examples, and that the interactive avatar training system may be performed with fewer or different or additional engines. It is noted that the application module 270 may be in electrical communication with the memory 265 or other components in the server computer 160, or with the memory 214 in the computing device 200a, so that the processors 267 of the server computer 160 may retrieve the information therefrom directly or indirectly through the network 190.

In some examples, the SIM engine 271, when executed by the processor(s), may process the input from the user to create an avatar. The SIM engine 271 functions similarly to the SIM engine 224 in the computing device 200a described above. The SIM engine 271 may create an avatar in a virtual space based on the settings, input, and preferences from the user.

The answer engine 272, when executed by the processor(s) 267 in the server computer 160 or by the processor 216 in the computing devices 200a, may process and generate an answer or response to the user or to the avatar created in the interactive avatar training system. The answer engine 272 functions similarly to the answer engine 226 as described above that may be able to provide a response or an answer in a professional level to a trainee, or an avatar trainee.

The audio engine 273, when executed by the processor(s) 267 in the server computer 160 or by the processor 216 in the computing devices 200a, may process an audio input from the user. The audio engine 273 may process the audio input as captured to simulate sound or voice from the user and convert the simulated sound or voice into a corresponding audio signal for output as an avatar speech signal. The generated audio signal from the audio engine 273 may be transmitted to the SIM engine 271 to synchronize the avatar speech signal with the lip movements, gestures, or body movements of the avatar created by the SIM engine 271. The audio engine 273 may be in communication with the SIM engine 271 to facilitate transmission of the audio signal from the audio engine 273 to the SIM engine 271, or vice versa, so as to assist in creating the avatar with desired voice output. Alternatively, the generated audio signal from the audio engine 273 may be output in any suitable manners.

The graphic engine 274, when executed by the processor(s) 267 in the server computer 160 or by the processor 216 in the computing devices 200a, may process images, photos, videos, or other information captured by the camera 245 so as to generate associated graphic signal, such as body movement, gestures, behavior reaction or the like, to be output on the output device 236, such as a display screen, in the computing device 200a or a head-mounted display that the user interacts with, in a three-dimensional or two dimensional format to the avatar, in the virtual environment setting wherein the avatar is appeared. The generated graphic signal from the graphic engine 274 may be in communication with the SIM engine 271 to facilitate transmission of the graphic signal from the graphic engine 274 to the SIM engine 271, or vice versa, so as to assist creating the avatar with a desired image simulated the appearance of the user. The SIM engine 271 may integrate the graphic signal from the graphic engine 274 and the audio signal from the audio engine 273 to create and perfect the avatar with desired lip synchronization, photorealistic skin, facial expressions, etc.

The key term identifying engine 275, when executed by the processor(s) 267 in the server computer 160 or by the processor 216 in the computing devices 200a, may analyze or process the input from the user to capture key sematic phrases, identifiers, key words, and/or key terminologies (collectively referred as "identifiers" herein) and transmit such captured identifiers to the answer engine 272 for further processing and analysis to generate a corresponding answer or response. For example, the processor(s) 267, 216 may search identifiers that refer to user specific activities, events, training programs, or the like. Such identifiers may include, for example, harassment, fire drill, inequitable conduct, discrimination, duty, and the like. Thus, when such identifiers are detected or identified, a search related to these identifiers may be conducted by the answer engine 272 to look up a proper answer or response. The key term identifying engine 275 is similar to the key term identifying engine 223 described above.

The recording or replay engine 276, when executed by the processor(s) 267 in the server computer 160 or by the processor 216 in the computing devices 200a, may process and save the response and/or answer from the answer engine 272, 226 to allow the generated or processed response and/or answer to be recorded and replayed when triggered by the user. Thus, the user, or the trainee, may utilize the replaying function to revisit the training program for repetitive practices to enhance the learning experience and reinforce their learning and neural embedding.

The recommendation engine 277, when executed by the processor(s) 267 in the server computer 160 or by the processor 216 in the computing devices 200a, may generate a recommendation score based on the search results provided from the answer engine 272. In some examples, the answer engine 272 may provide multiple answers or response in response to the input from the user, so that the user may determine an answer or response that best fits his/her intended query/input based on his/her own selection. For example, the search results populated or generated by the answer engine 272 may be displayed on the display screen 250 with recommendation scores or other associated information for each search results. By computationally analyzing the correlations and factors of the training situation as well as the identifiers detected, an overall high confidence level of the search results to the answers or responses may be generated. Furthermore, the recommendation score is also generated based on the evaluation of the overall confidence level including correlations of the one or more identifiers detected and the training content selected. As such, a recommendation score with a relatively high confidence level may be obtained. Thus, a delightful user experience may be obtained based on the answer or response with high accuracy level generated in response to the input from the user or based on multiple possible answers or responses that allows the user to select the answer or response that best fits his/her intended query.

The unreal engine 278, when executed by the processor(s) 267 in the server computer 160 or by the processor 216 in the computing devices 200a, may process and generate a virtual space or a virtual environment wherein the avatars may be presented. The unreal engine 278 may be a virtual reality engine that may provide virtual environment data to the SIM engine 271 to facilitate the virtual environment where the avatars may be present. The SIM engine 271 may assist integrating the virtual environment with the avatars as created that allows the user to interact and participate training programs in the virtual environment. The users may access the virtual environment remotely via network and create the avatars to be in mutual communications and interaction in the virtual environment.

Although FIGS. 1 and 2 show only two computing devices 200a, 200b, the interactive avatar training system 100 may include any number of computing devices. References to a processor, memory, or other elements of servers or computing devices will be understood to include references to a collection of processors, memories, or elements that may or may not operate in cooperation. The memories may include a database that stores key words and/or questions that may facilitate operation of the interactive avatar training system. Moreover, each server and computing device may be comprised of multiple servers and/or computing devices. For example, each server computing device 110 may include multiple server computing devices acting in cooperation to execute applications or other instructions as described herein. Yet further, although some functions described herein are indicated as taking place on a single computing device or server, various aspects of the subject matter described herein can be implemented by a plurality of computing devices or servers, for example, communicating information over network 160, as described herein.

Figure 3:
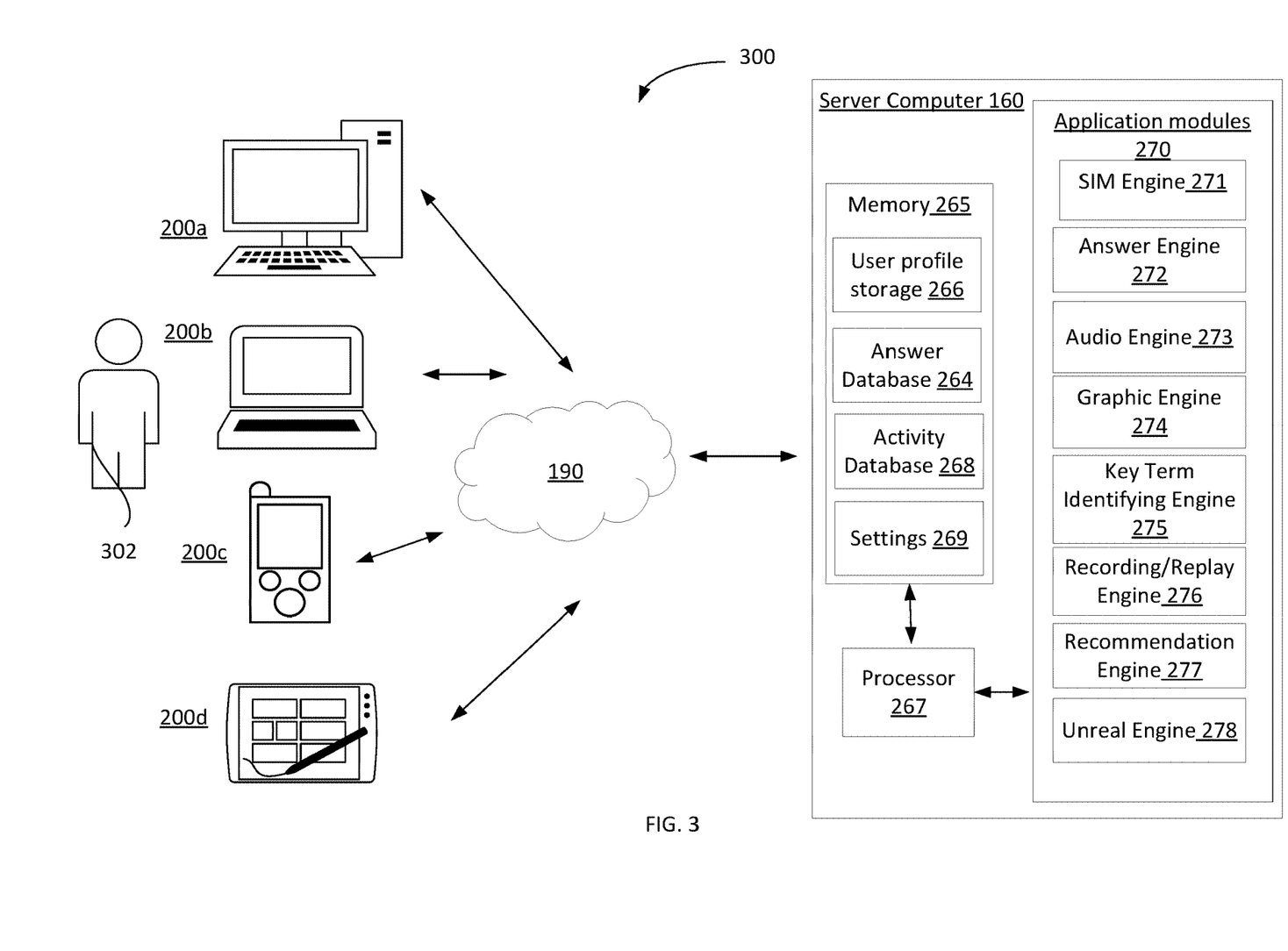
FIG. 3 is a pictorial diagram of a networked interactive avatar training system according to aspects of the disclosure.

FIG. 3 illustrates an example avatar training system 300 with four computing devices including computing devices 200a and 200b, as shown in FIGS. 1 and 2, as well as computing devices 200c, 200d, that a user 302 may interact with. The computing devices 200a-d are configured such that they may communicate with the server computer 160 via network 190. The computing devices may be a desktop computer 200a, a laptop 200b, a portable device 200c, a tablet 200d, or any other device capable of communication over a network and performing computational operations in the interactive avatar training system. For instance, computing devices 200a-d can each be any of a full-sized personal computer such as a desktop, a laptop computer, a mobile phone, or a device such as a tablet PC, gaming system, wearable computing device, netbook, or any other device capable of communicating via a network.

Figure 4:
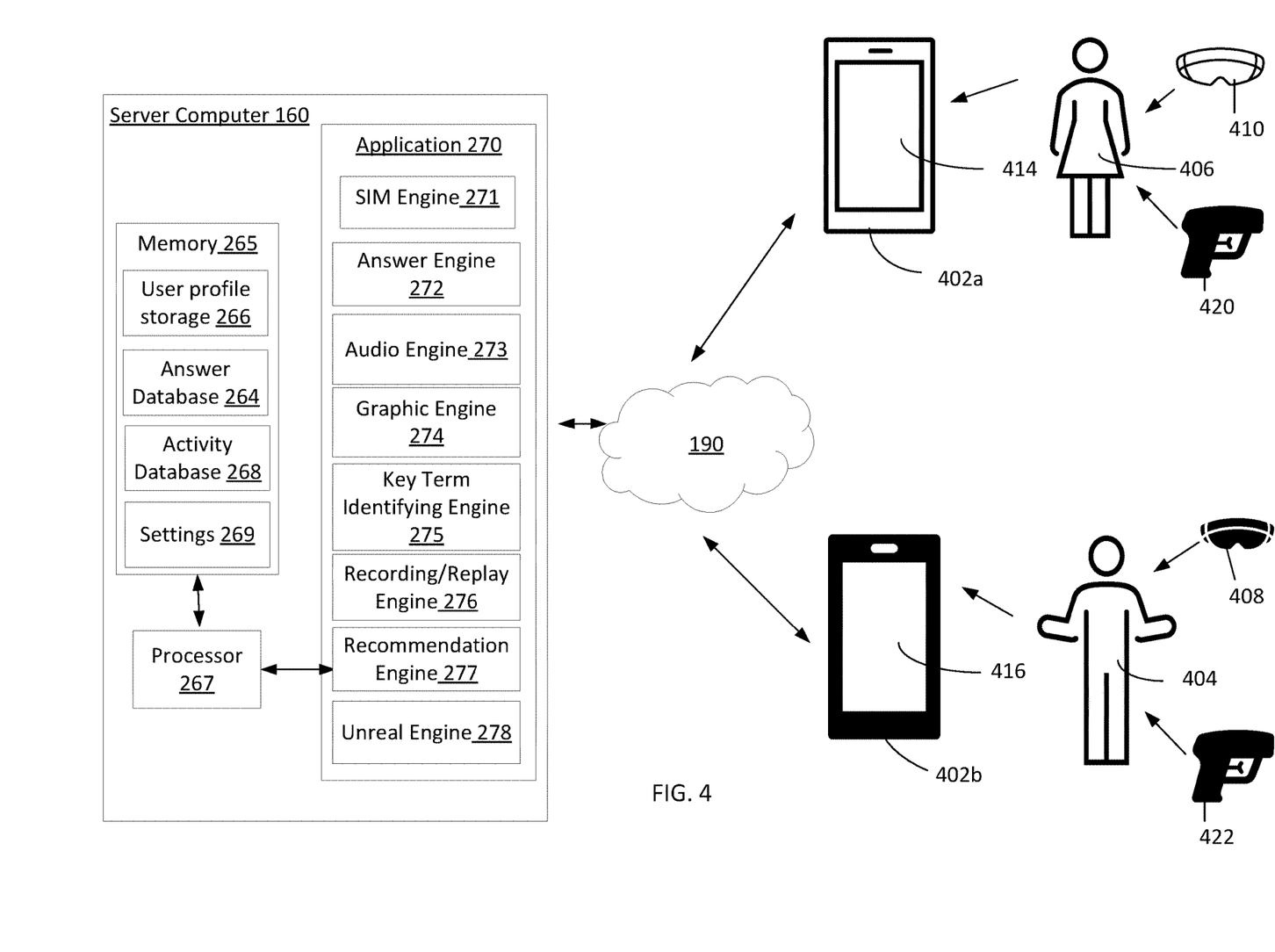
FIG. 4 depicts a further pictorial diagram of a networked interactive avatar training system according to aspects of the disclosure.

FIG. 4 illustrates an example of operating the interactive avatar training system by at least two users 404, 406, such as a trainer 406 and a trainee 404, utilizing a respective computing device 402a, 402b, which are similarly configured to the computing device 200a depicted in FIG. 2. A first user 406, such as a trainer, a coach or a mentor in a working environment, and a second user 404, such as a trainee, a student or a mentee, may utilize the computing device 402a, 402b respectively to operate the interactive avatar training system. The interactive avatar training system may utilize the SIM engine 271 (or the SIM engine 224 programed or embedded in the computing devices 402a, 402b) to launch a virtual simulation application where the interactive avatar training system may be operated to create a virtual space/environment for interaction between the at least two users 406, 404. During operations, other modules, such as the answer engines 272, 226, key term identifying engine 275, 223, and other suitable engines and applications in the server computer 160 and/or the computing device 200a, may also be utilized to enable operation of the interactive avatar training system.

In one example, the first user 406 may register in the interactive avatar training system as a trainer while the second user 404 may register in the interactive avatar training system as a trainee. The interactive avatar training system enables the first and the second users 404, 406 to register in a trainer-trainee, mentor-mentee, or coach-student relationship for interaction. The interaction between the first and the second users 406, 404 in the virtual space created in the interactive avatar training system may be in real time or may be pre-programed or pre-recorded. The first and the second users 406, 404 may participate and engage in the events, activities, training programs in the virtual space by utilizing a head-mounted display (HMD) 410, 408 and/or a motion or gesture detector 420, 422 and/or other associated detectors/sensors. The head-mounted display (HMD) 410, 408, the motion or gesture detector 420, 422, or other associated sensors may allow the users to view and interact with the avatars, creatures, and other elements in the virtual environment to assist better understanding, engaging or simulating the training situations so as to enhance the interactive experience. It is noted that although the motion or gesture detector 420, 422 depicted in FIG. 4 is a hand-held/hand-grip device, it is noted that other types of the motion detector, such as wearable devices or other suitable sensors, may also be utilized to assist detect and sense the movement, gestures, and reactions of the users 406, 404. Alternatively, when the head-mounted display (HMD) 410, 408 and/or the motion or gesture detector 420, 422 are not available to the users 406, 408, the users 406, 404 may participate in the events, activities, training programs in the virtual environment by directly viewing the content populated in the display screens 416, 414 and inputting commands directly to the computing devices 402a, 402b using the user interface device 232 defined therein.

Figure 5:
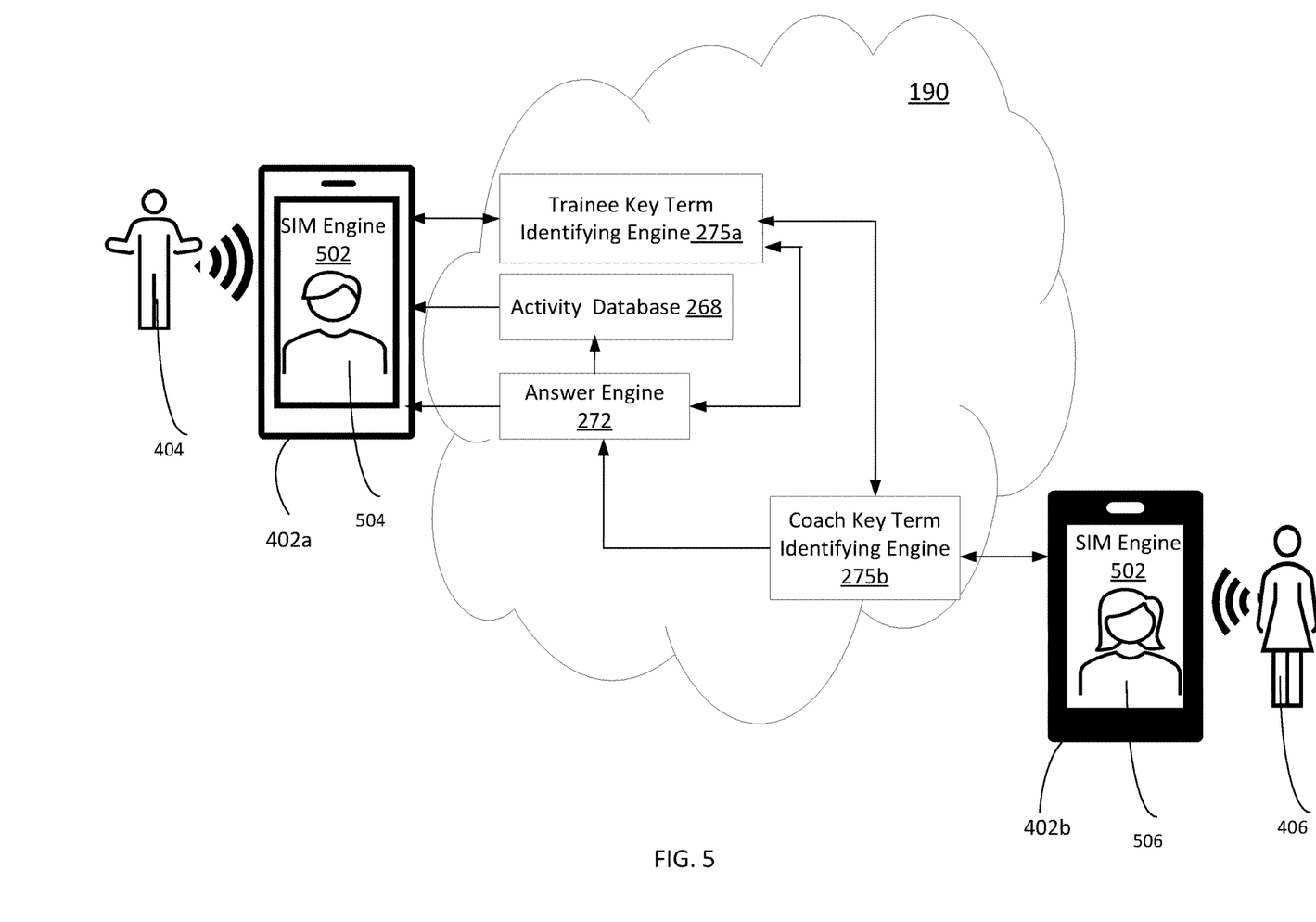
FIG. 5 depicts a further block diagram of a networked interactive avatar training system according to aspects of the disclosure.

FIG. 5 depicts a signal processing diagram when executing an interactive avatar training system via computing devices 402a, 402b. The interactive avatar training system may be a software application, such as a virtual simulation application, programed in the computing device 402a, 402b utilizing the multiple engines, such as the SIM engine, answer engine, key term identifying engines or other associated engines, configured in the computing devices 402a, 402b or in the server computer 160 that is in electrical communication via network 190.

In the example depicted in FIG. 5, the first user 406 may be a trainer, a coach, or a mentor and the second user 404 may be a trainee, a student or a mentee. Both the first and the second users 406, 404 may execute the virtual simulation application to launch the interactive avatar training system in the computing devices 402a, 402b. The virtual simulation application is configured to execute the SIM engine and other associate engines to operate the interactive avatar training system. Once the virtual simulation application is launched, the users 406, 404 may be requested to select or create a model of an avatar to represent the users. It is noted that other engines, such as the audio engine, graphic engine and the like, in the computing devices may be executed along with the SIM engine for avatar creation. The avatar creation may include a video avatar selection and an audio transformation selection. A plurality of avatars may be displayed from which a user may select a desired avatar. Alternatively, the user may input desired biometric details, dimensions, numbers or other information as needed to create his/her own avatar. Once an avatar is selected or created, an associated audio transformation may also be selected. Alternatively, the user may input his/her own voice/sound for audio creation to be mapped to the avatar. As described above, an avatar is defined as a graphic representation of a user in either two dimensions (2D), such as the avatars 504, 506 created and displayed in the computing devices 402a, 402b respectively, or in three dimensions (3D) appeared in a virtual environment. The avatars as selected or created may or may not have to resemble the looks of the user. The avatars may be representations of the users taking the form of images or videos taken by the camera in the computing devices.

Once the avatars 504, 506 are created to represent the users 404, 406, respectively, the users 404, 406 may execute the interactive avatar training system to enable the communications between the avatars 504, 506. The communications between the avatars 504, 506 may be activated once both the computing devices 402, 402b are connected to the network 190 to establish a connection. The communication configuration includes identification of at least one computing device launching or participating the interactive avatar training system. For example, the first user 406, represented by the first avatar 506, may select from an avatar from a list of avatars, such as the second avatar 504 representing the second user 404 who is also executing the computing device 402a participating in the interactive avatar training system, to facilitate and commence performing a training program. Although in the example depicted in FIG. 5 only shown two users 406, 404 utilizing two avatars 506, 504, it is noted that multiple users may utilize multiple avatars in the interactive avatar training system simultaneously, non-simultaneously, or other suitable manners.

After the avatars 504, 506 are selected and created, the second user 404, such as a trainee or a student, may receive a series of training program, including training content provided and generated from the activity database 268, or other suitable database, modules, or engines interfaced with the interactive avatar training system. The training program or materials may also be assigned by the first user 406, such as the trainee or the coach, to determine proper training content or program to be given to the second user 404, such as a trainee or a student. The display screens from the computing devices 402, 402b may play the training content that allows the first and second users 406, 404 to watch the avatars 504, 506 interacting with each other when playing the training content in the virtual environment.

Prior to, during, or after performing of the training process, the first and the second users 406, 404 may interactively participate and communicate for queries, questions, situation simulation or other associated activities to ensure that the training content of the training program is properly and correctly delivered to the second user 404, such as the trainee or the student.

In one example, the interaction between the first and the second users 406, 404 may be initiated by inputting a query, such as an inquiring input, either from the first or the second user 404, 406. In one example, the query may be input from the second user 404, such as the trainee or the student. The query may be processed or transmitted through a key term identify engine, such as the trainee key term identifying engine 275a depicted in FIG. 5, to identify the identifiers from the query input from the second user 404. Such identifiers may then be transmitted to the coach key term identifying engine 275b for further processing. The coach key term identifying engine 275b may then output the query with proper identifiers to the first user 406, such as the trainer or the coach. Although in the example depicted in FIG. 5 shows the key term identifying engine including a coach key term identifying engine 275b and a trainee key term identifying engine 275a, it is noted that, in some examples, only one key term identifying engine may be utilized to process, analyze, or detect the key terms from the query or input from both the first and the second users 406, 404.

After the query with the proper identifiers are output to the first user 406, such as the trainer or the coach, the first user 406 may then generate an answer or a response to respond to the query from the second user 404, such as the trainee or the student. The answer or the response input from the first user 406 may then also be transmitted through the coach key term identifying engine 275b to identify the identifiers from the answer or response. Once the identifiers from the answer or response are identified and detected by the coach key term identifying engine 275b, such identifiers may then be transmitted to the answer engine 272. As described above, the answer engine 272 may further process such identifiers to modify and generate a processed or optimized answer or response at an elite level. Thus, by utilizing the computational analysis and processing from the answer engine 272, the first user 406, such as the trainer or the coach, may generate or provide an answer or response in an ordinary, simple or casual manner and rely on the answer engine 272 to process, perfect and optimize the answer or response with high accuracy, high professionalism, or most updated information, such as newer rules, regulatory or compliance, set by the corporate.

Alternatively, the answer engine 272 may include some pre-stored answers or response. Thus, in the situation after the proper identifiers are identified, the trainee key term identifying engine 275a and/or the coach key term identifying engine 275b may then first communicate with the answer engine 272 to look up for available answers or responses prestored in the answer engine 272. In the situation wherein the answer engine 272 has a pre-stored answer or response that responds to the query from the second user 404, such as the trainee or the student, the answer or the response may be output to the second user 404, such as the trainee or the student, without requiring the first user 406 to answer or respond to the query. Thus, the staff operation and manpower required for the training program may be saved and the training time required for the training program may be shortened and be more efficiently managed.

In one example, the answer engine 272 may utilize a machine learning technique, an artificial intelligence system, a deep learning technique, or other similar techniques to generate a well thought-out response to the query from the second user 404, such as the trainee or the student, without the first user 406, such as the trainer or the coach frequently involved. It is noted that the interaction between the first and the second users 406, 404 may be in real time or may be in a pre-programed or pre-stored simulation based on different training requirements and situations.

Furthermore, the answer or the response output to the second user 404, such as the trainee or the student, may be accompanied by a recommendation score. The answer or the response with the recommendation scores may be output to allow the second user 404, such as the trainee or the student, to select, accept or deny recommended results that best fit his/her intended query.

Figure 6:
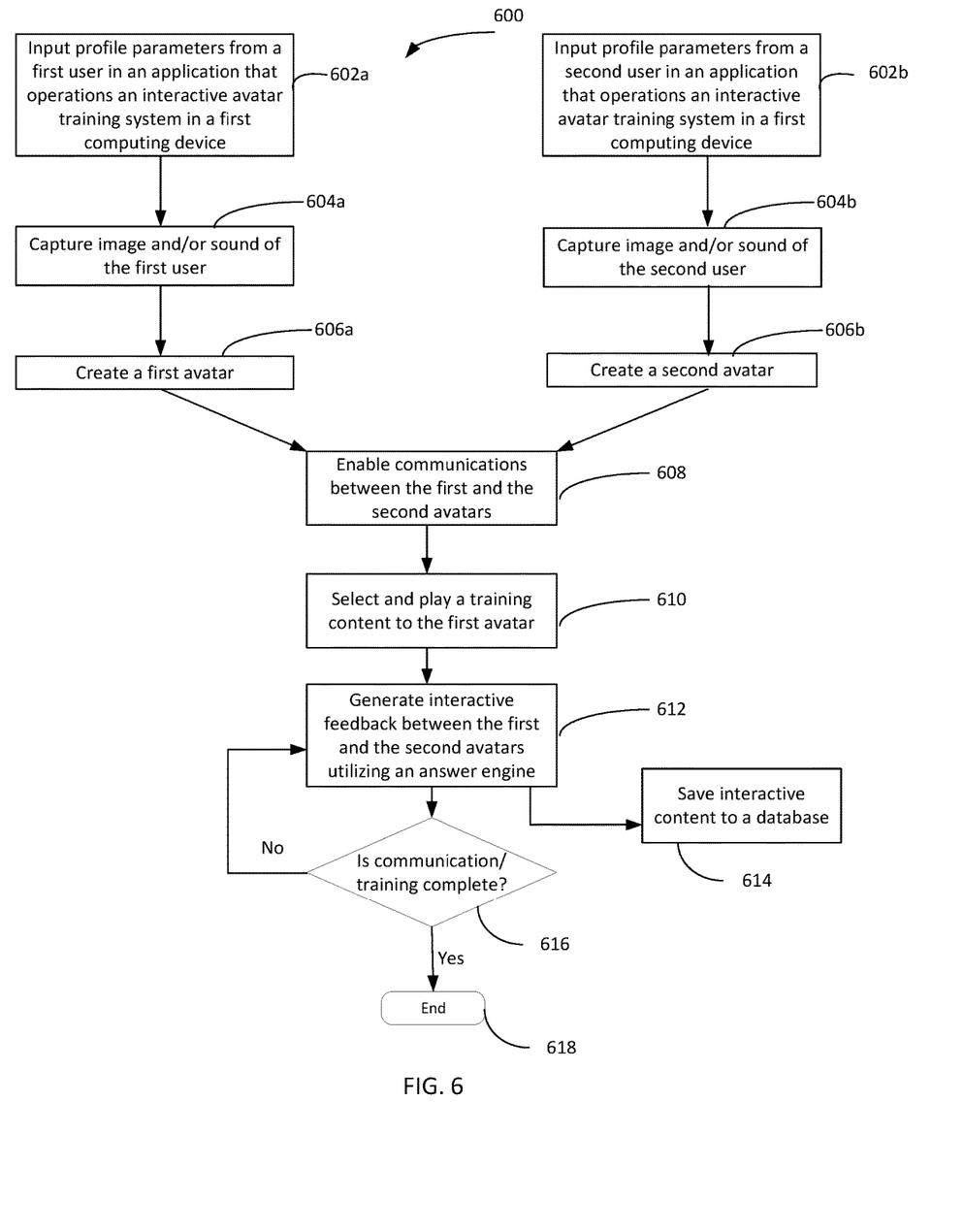
FIG. 6 depicts a flow diagram of the operation of an interactive avatar training system with multiple users according to aspects of the disclosure.

FIG. 6 depicts a flow diagram illustrating an example method 600 of performing a training program utilizing the interactive avatar training system by at least a first and a second user, such as a trainer and a trainee. Such method may be performed by operations utilizing a computing device, such as one or more of computing devices 200a, 200b, 200c, 200d, 402a, 402b described above, modifications thereof, or any of a variety of other computing devices having different configurations, operated by at least the first and the users. Access or gathering of data associated with the users in response to the training program will require authorization and input from the user.

The operations involved in the following methods need not be performed in the precise order described. Rather, various operations may be handled in a different order or simultaneously, and operations may be added or omitted.

The operation starts at block 602a and 602b. It is noted that a first user may utilize a first computing device to operate the interactive avatar training system utilizing the method 600 including block 602a, 604a, 606a, 608, 610, 612, 614, 616 while a second user may utilize a second computing device to operate the interactive avatar training system utilizing the method 600 including block 602b, 604b, 606b, 608, 610, 612, 614, 616. The first and the second users may be interactively communicated through the interactive avatar training system when the communications between the first and the second users are activated via network.

At block 602a, the first user may input his/her profile in an application operating the interactive avatar training system in the first computing device. Similarly, at block 602b, the second user may his/her profile in an application operating the interactive avatar training system in the second computing device.

At block 604a, after the user profiles have been input, the image and the sound of the first user may be captured and collected by the first computing device. Similarly, at block 604b, the image and the sound of the second user may be captured and collected by the second computing device.

At block 606a, based on the profile and the captured information, the first user may create a first avatar in the interactive avatar training system At block 606b, the second user may create a second avatar in the interactive avatar training system.

At block 608, once the avatars are created, the communications between the avatars may be activated by mutual selection by the first and/or the second users, or automatically initiated by the interactive avatar training system. For example, the first user, such as a trainer, may select a second user, such as a trainee, to proceed with the training program via the interactive avatar training system. Alternatively, the second user, such as a trainee, may select a first user, such as the trainer, to proceed with the training program. In some examples, the interactive avatar training system may perform a computational matching process to automatically pair up the first and the second users based on the types of the training contents needed by the individual users.

At block 610, once the pair of the users, such as the trainer and the trainee, are determined, a training content of the training program may be selected to provide information needed to train the second user, such as the trainee. In one example, the training content may include discrimination and harassment training materials and generated content following established and predetermined procedures and company policies. These procedures may follow established human resource guidelines and used to establish the key words applied in the key term identifying engine. The training program may help the trainee, such as a new or old employee in a corporation, learn about what is and what is not harassment or discrimination and how to successfully address the situation without violation of the rules, compliance, regulations, or associated law set in the organization.

At block 612, during or after the training program, the first and the second users may interactively communicate bidirectionally to provide responses, answers or feedbacks to questions, queries, or any simulated situations, if any. For example, the trainee avatar, controlled by the second user, may ask a question, such as generating an inquiry input in the interactive avatar training system, to the trainer avatar. The trainer avatar, controlled by the first user, may answer the question, such as generating an initial responding input in the system. The answer engine in the interactive training system may assist processing, optimizing and perfecting the answers or responses from the trainer avatar, such as generating a processed or optimized responding input in the system, to enhance the accuracy of the answers or responses and promote communication efficiency. In another example, the trainer avatar, controlled by the first user, may ask questions (or perform a test) to the trainee avatar to ensure the training content is correctly and properly delivered to the trainee avatar, controlled by the second user, without misunderstanding or miscommunications.

At block 614, during interaction and the communications of the trainer and trainee avatars, the interactive content may be stored to the database in the computing device, or in the server computer via network. As described above, the answer engine may utilize a machine learning technique so that each answers or responses generated to the answer engine may be stored and gone through a computational analysis. By doing so, when similar questions or queries appear again from future trainee avatars, the answer engine in the interactive avatar training system may automatically generate proper answers or responses to the questions, under the presentation of the trainer avatar, without needing the first user, a real human being, to address similar questions repetitively. Thus, the training efficiency may be improved, and the manpower may be saved in the corporate when the training programs are performed. Furthermore, the saved interactive content may be repetitively reviewed and relearned by the trainee avatar to enhance the learning experience or reinforce the neural embedding of the learner.

At block 616, after the training content is delivered and the questions are answered, the interactive avatar training system may seek confirmation from the trainer avatar, trainee avatar, or both. Once both sides are confirmed with completion of the training program, the training program may then be ended, as shown in block 618. In contrast, if any side, either trainer avatar or trainee avatar, think there are any unsolved questions or situations that need additional explanation or discussion, the training program may be looped back to the block 612 for further interaction and communications. For example, the trainer avatar may provide a list of test questions or situational simulations to the trainee avatar to respond and participate. When the trainee avatar answers the questions correctly or perform a response to the situational simulation in a proper and correct manner, the trainer avatar may approve and agree that the training process to be marked completed. In contrast, when the trainee avatar does not pass a certain level of correctness from the test or situational simulations performed, the trainee avatar may be requested to redo or relearn the training content selected at block 610, or the trainer avatar may assign additional training content to help the trainee avatar understand and pass the training test.

Figure 7:
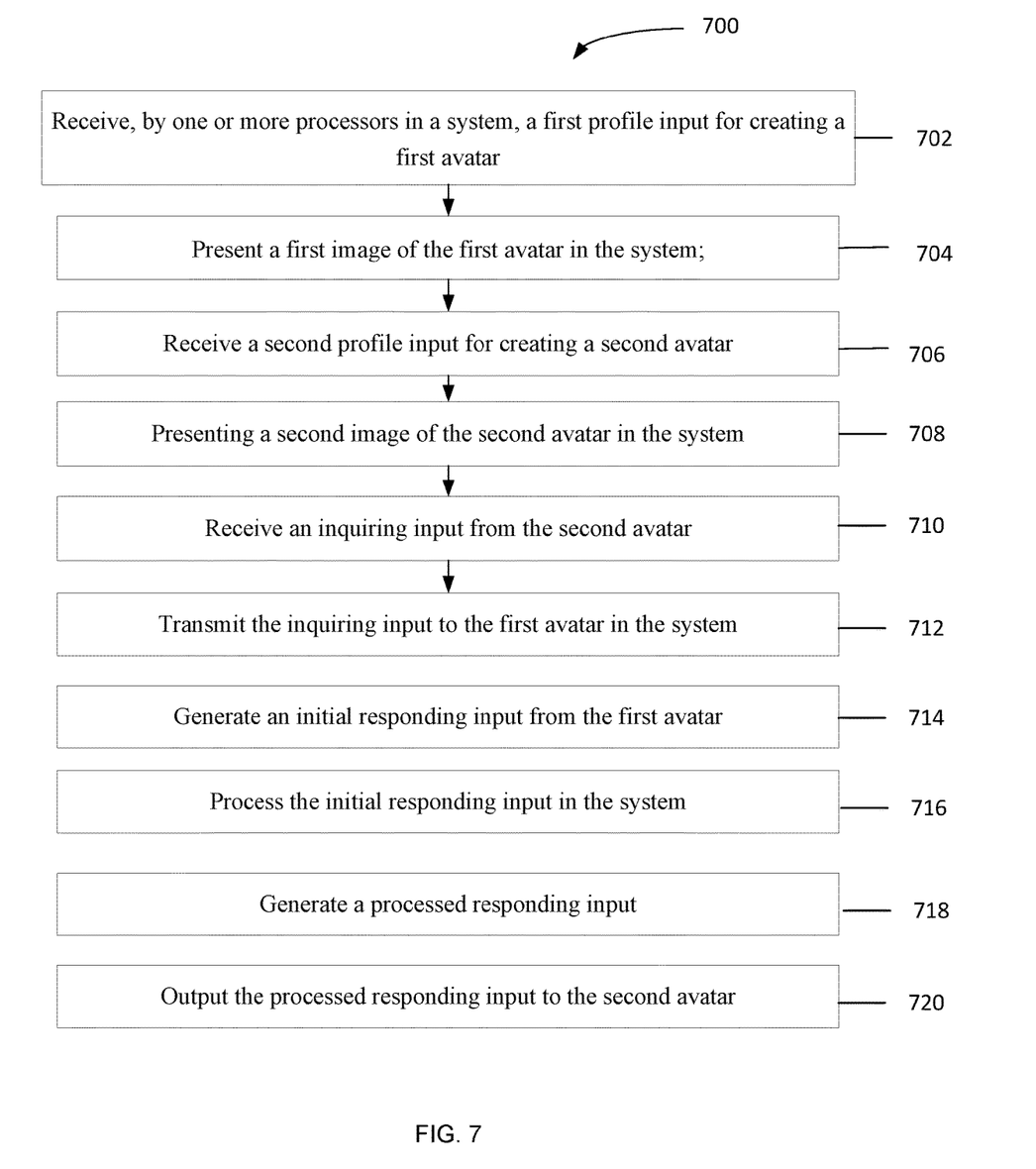
FIG. 7 depicts a flow diagram of a method of operating an interactive avatar training system according to aspects of the disclosure.

FIG. 7 depicts a flow diagram illustrating an example method 700 of performing a training program utilizing the interactive avatar training system. The operations involved in the following methods need not be performed in the precise order described. Rather, various operations may be handled in a different order or simultaneously, and operations may be added or omitted.

The operation starts at block 702. A first profile input for creating a first is received by one or more processors in a system, such as an interactive avatar training system.

At block 704, a first image of the first avatar is presented in the system by the one or more processors in the system.

At block 706, a second profile input for creating a second avatar is received by the one or more processors in the system.

At block 708, a second image of the second avatar is presented by the one or more processors in the system.

At block 710, an inquiring input from the second avatar is received by the one or more processors in the system.

At block 712, the inquiring input is transmitted to the first avatar in the system by the one or more processors in the system.

At block 714, an initial responding input from the first avatar is generated by the one or more processors in the system.

At block 716, the initial responding input is processed by the one or more processors in the system.

At block 718, a processed response is generated based on the initial responding input by the one or more processors in the system.

At block 720, the processed response is outputted to the second avatar by the one or more processors in the system.

The present disclosure provides an interactive avatar training system. The interactive avatar training system allows a trainer to input an answer/response to a question from a trainee in a simplified format in a virtual environment. The answer engine in the interactive avatar training system may then process and optimize the answer or response to a professional level so that the training process may be maintained concise to save the overall training time. Furthermore, the optimized or processed answer may also promote the training accuracy delivered to the trainee. The answer or response may further be output with a recommendation score so that the trainee may select an answer that best fits his/her intended query.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An interactive avatar training system, comprising:
a server computing device, the server computing device comprising:
one or more memories;
one or more processors in communication with the one or more memories, the one or more processors configured to:
receive a first input to create a first avatar representing a trainer, coach, or mentor associated with a first user of a first computing device;
receive a second input to create a second avatar representing a trainee, student, or mentee associated with a second user of a second computing device;
present the first and the second avatars in a virtual employee training environment;
receive a question from the first computing device in the virtual employee training environment;
receive an answer from the second computing device;
process the answer, wherein processing the answer comprises:
identifying one or more identifiers from the received answer; and
generating an optimized answer by refining the received answer based on the one or more identifiers;
convert the optimized answer to a speech signal; and
output the optimized answer in response to the question in the virtual employee training environment, wherein the optimized answer is output via the speech signal through a simulation engine such that the speech signal is synchronized with lip movements, gestures, and/or body movements of the second avatar created by the simulation engine.

2. The interactive avatar training system of claim 1, wherein prior to outputting the answer, the one or more processors are further configured to:
access a pre-stored database of answers from the one or more memories; and
select an answer from the pre-stored database, wherein the selected answer is the optimized answer.

3. The interactive avatar training system of claim 1, wherein receiving the question from the first computing devices further comprises:
identifying a key word from the question.

4. The interactive avatar training system of claim 1, wherein the optimized answer is generated by a machine learning algorithm.

5. The interactive avatar training system of claim 1, wherein the one or more processors are further configured to:
generate a recommendation score with the optimized answer.

6. The interactive avatar training system of claim 1, wherein outputting the optimized answer further comprises:
outputting one or more answers in the virtual employee training environment; and
generating a recommendation score to each of the answers.

7. The interactive avatar training system of claim 1, wherein the one or more processors are further configured to:
record the question and the optimized answer generated in the virtual employee training environment.

8. The interactive avatar training system of claim 7, wherein the one or more processors are further configured to:

replay the question and the optimized answer in the virtual employee training environment.

9. The interactive avatar training system of claim 1, wherein the first and the second computing device are in communication with the server computing device via a network.

10. The interactive avatar training system of claim 1, wherein the optimized answer is generated in real time or is selected from predetermined answers in the virtual employee training environment.

11. The interactive avatar training system of claim 1, wherein the one or more processors are further configured to:
display a training content to the second avatar in the virtual employee training environment.

12. The interactive avatar training system of claim 11, wherein the one or more processors are further configured to:
generate a plurality of tests for the second avatar in the virtual employee training environment.

13. The interactive avatar training system of claim 1, wherein the one or more processors are further configured to:
receive motion data associated with motion of the first user captured by one or more sensors,
wherein presenting the first avatar in the virtual employee training environment comprises synchronizing gestures and/or body movements of the first avatar to the motion of the first user based on the received motion data.

14. The interactive avatar training system of claim 1, wherein the one or more processors are further configured to:
receive motion data associated with motion of the second user captured by one or more sensors,
wherein presenting the second avatar in the virtual employee training environment comprises synchronizing gestures and/or body movements of the second avatar to the motion of the second user based on the received motion data.

15. An interactive avatar training system, comprising:
a server computing device in communication with a first computing device and a second computing device, wherein the server computing device is configured to:
receive, from the first computing device, a first profile input for creating a first avatar representing a trainer, coach, or mentor associated with a first user of the first computing device;
receive, from the second computing device, a second profile input for creating a second avatar representing a trainee, student, or mentee associated with a second user of the second computing device;
generate a simulated learning environment comprising the first avatar and the second avatar that allows interaction between the first and the second avatars;
output a question by the first avatar during the interaction;
receive an answer from the second computing device;
process the answer, wherein processing the answer comprises:
generating an optimized answer by refining the received answer using a machine learning algorithm; and
output the optimized answer in the simulated learning environment, wherein the optimized answer is output via a speech signal through a simulation engine such that the speech signal is synchronized with lip movements, gestures, and/or body movements of the second avatar created by the simulation engine.

16. The interactive avatar training system of claim 15, wherein the one or more processors are configured to identify one or more key words from the question, the one or more key words being provided to the machine learning algorithm for generating the optimized answer.

17. The interactive avatar training system of claim 16, wherein the one or more processors are configured to generate a recommendation score with the optimized answer.

18. An interactive avatar training system, comprising:
a server computing device comprising:
one or more memories:
one or more processors in communication with the one or more memories, the one or more processors configured to:
receive a first profile input for creating a first avatar representing a trainer, coach, or mentor associated with a first user of a first computing device;
present a first image of the first avatar in a simulated environment;
receive a second profile input for creating a second avatar representing a trainee, student, or mentee associated with a second user of a second computing device;
present a second image of the second avatar in the simulated environment;
receive an inquiring input from the first avatar via the first computing device;
transmit the inquiring input to the second avatar in the simulated environment;
generate an initial responding input from the second avatar;
process the initial responding input in the simulated environment, wherein processing the initial responding input comprises:
identifying one or more identifiers from the initial responding input; and
generating an optimized response by refining the initial responding input based on the one or more identifiers; and
output the optimized response to the first avatar in the simulated environment, wherein the optimized response is output via a speech signal through a simulation engine such that the speech signal is synchronized with lip movements, gestures, and/or body movements of the second avatar created by the simulation engine.

* * * * *